United States Patent
Tsurugai et al.

(10) Patent No.: US 10,369,749 B2
(45) Date of Patent: Aug. 6, 2019

(54) THERMAL CAULKING DEVICE

(71) Applicant: HONDA MOTOR CO., LTD., Minato-ku (JP)

(72) Inventors: Yoshinori Tsurugai, Tochigi (JP); Hiroshi Ishikawa, Tochigi (JP); Yuichi Tajiri, Tochigi (JP); Shigeto Akahori, Tochigi (JP); Naohiro Ohtsu, Tochigi (JP); Satoshi Shiozaki, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/033,863

(22) Filed: Jul. 12, 2018

(65) Prior Publication Data

US 2019/0022954 A1   Jan. 24, 2019

(30) Foreign Application Priority Data

Jul. 21, 2017   (JP) .................................. 2017-141795

(51) Int. Cl.
*B32B 7/08*   (2019.01)
*B60J 10/00*   (2016.01)
(Continued)

(52) U.S. Cl.
CPC ............ *B29C 65/30* (2013.01); *B29C 65/606* (2013.01); *B29C 65/72* (2013.01); *B29C 66/301* (2013.01);
(Continued)

(58) Field of Classification Search
CPC ......... B29C 65/02; B29C 65/18; B29C 65/24; B29C 65/30; B29C 65/56; B29C 65/60;
(Continued)

(56) References Cited

U.S. PATENT DOCUMENTS 4,192,990 A * 3/1980 Ziaylek, Jr. ............. B25B 31/00
156/303.1
2003/0222067 A1* 12/2003 Shiba ......................... B30B 1/24
219/124.34

(Continued)

FOREIGN PATENT DOCUMENTS

JP          56046721 A   *  4/1981  ............. B29C 65/18
WO       2017/047786 A1      3/2017
WO   WO-2017047786 A1   *  3/2017  ............. B29C 65/20

*Primary Examiner* — Philip C Tucker
*Assistant Examiner* — Brian R Slawski
(74) *Attorney, Agent, or Firm* — Rankin, Hill & Clark LLP

(57) ABSTRACT

The first electrode section (7a) and the second electrode section (7b) are formed such that the outer portion connected to the upper portion of the heating section (6) is thinner than the inner portion connected to the lower portion of the heating section (6). The heating section (6) and the first electrode section (7a) are interconnected by an R-shaped first connecting portion (21). The inner circumferential sloping surface of the heating section (6) and the second electrode section (7b) are interconnected by an R-shaped second connecting portion (22). The first and second connecting portions (21)(22) are formed such that R becomes larger from the upper end to the lower end, where the upper portion is thin and the lower portion is thick. The thickness of an intermediate portion (6b) is smaller than the thicknesses of the first and second connecting portions (21)(22).

3 Claims, 12 Drawing Sheets

(51) Int. Cl.
*B29C 65/00* (2006.01)
*B32B 37/00* (2006.01)
*B32B 38/04* (2006.01)
*B27G 11/02* (2006.01)
*B29C 65/02* (2006.01)
*B31F 5/04* (2006.01)
*B29C 65/78* (2006.01)
*B29C 65/08* (2006.01)
*B30B 5/02* (2006.01)
*B30B 15/34* (2006.01)
*B21D 53/78* (2006.01)
*B21K 3/04* (2006.01)
*B23P 15/02* (2006.01)
*B29C 65/30* (2006.01)
*B29L 31/00* (2006.01)
*B29K 623/00* (2006.01)
*B29C 65/60* (2006.01)
*B29C 65/72* (2006.01)

(52) U.S. Cl.
CPC ...... *B29C 66/30321* (2013.01); *B29C 66/612* (2013.01); *B29C 66/81415* (2013.01); *B29C 66/81425* (2013.01); *B29K 2623/12* (2013.01); *B29L 2031/748* (2013.01)

(58) Field of Classification Search
CPC ..... B29C 65/606; B29C 65/72; B29C 66/301; B29C 66/303; B29C 66/30321; B29C 66/5221; B29C 66/612; B29C 66/81; B29C 66/814; B29C 66/81415; B29C 66/81417; B29C 66/81419; B29C 66/81422; B29C 66/81425; F04D 29/023; F04D 29/026; F04D 29/284; F04D 29/2222
USPC ............. 156/60, 91, 92, 196, 221, 224, 245, 156/272.2, 273.9, 274.4, 275.1, 290, 293, 156/294, 303.1, 349, 379.6, 379.7, 379.8, 156/380.2, 380.6, 423, 580, 581, 583.1; 29/23.51, 238, 464, 889, 889.1, 889.2, 29/889.21, 889.22, 889.23, 889.3, 889.4, 29/889.5, 889.6, 889.7
See application file for complete search history.

(56) References Cited

U.S. PATENT DOCUMENTS

2016/0341210 A1\* 11/2016 Ishikawa ............. F04D 29/2227
2017/0203499 A1\* 7/2017 Tsubone ................. B29C 65/30

\* cited by examiner

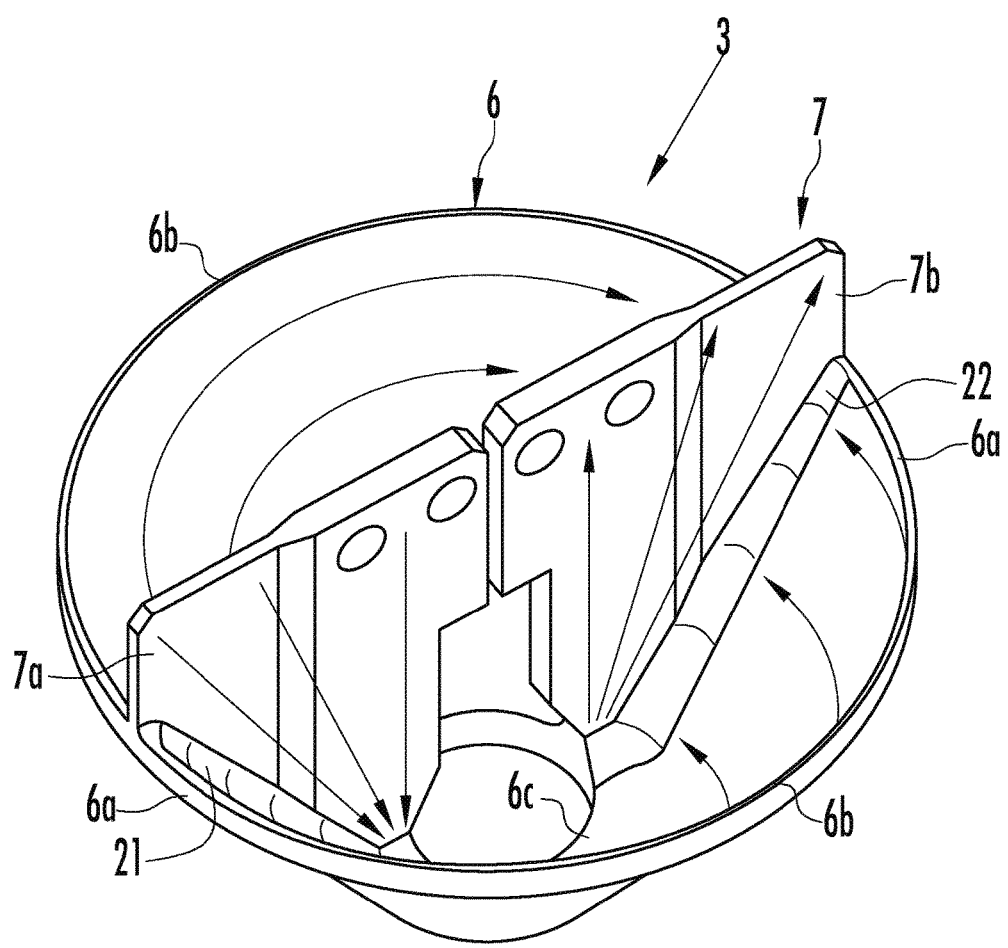

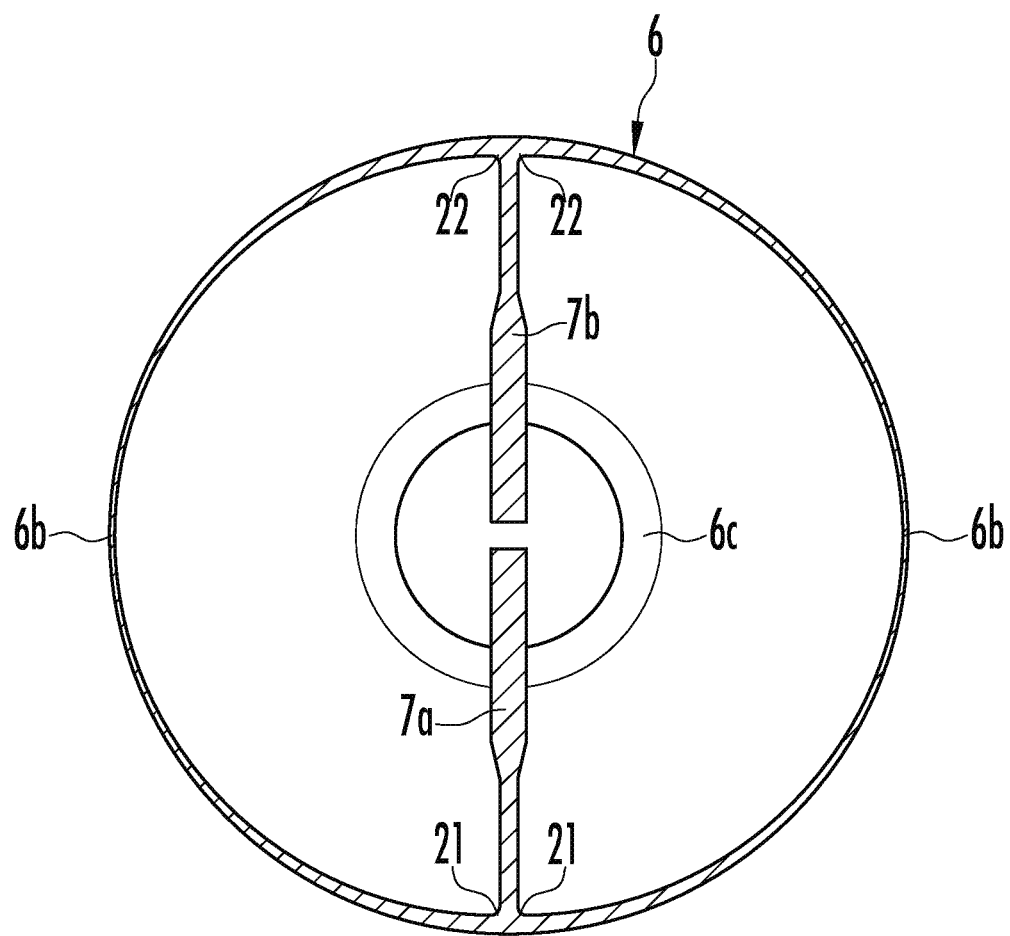

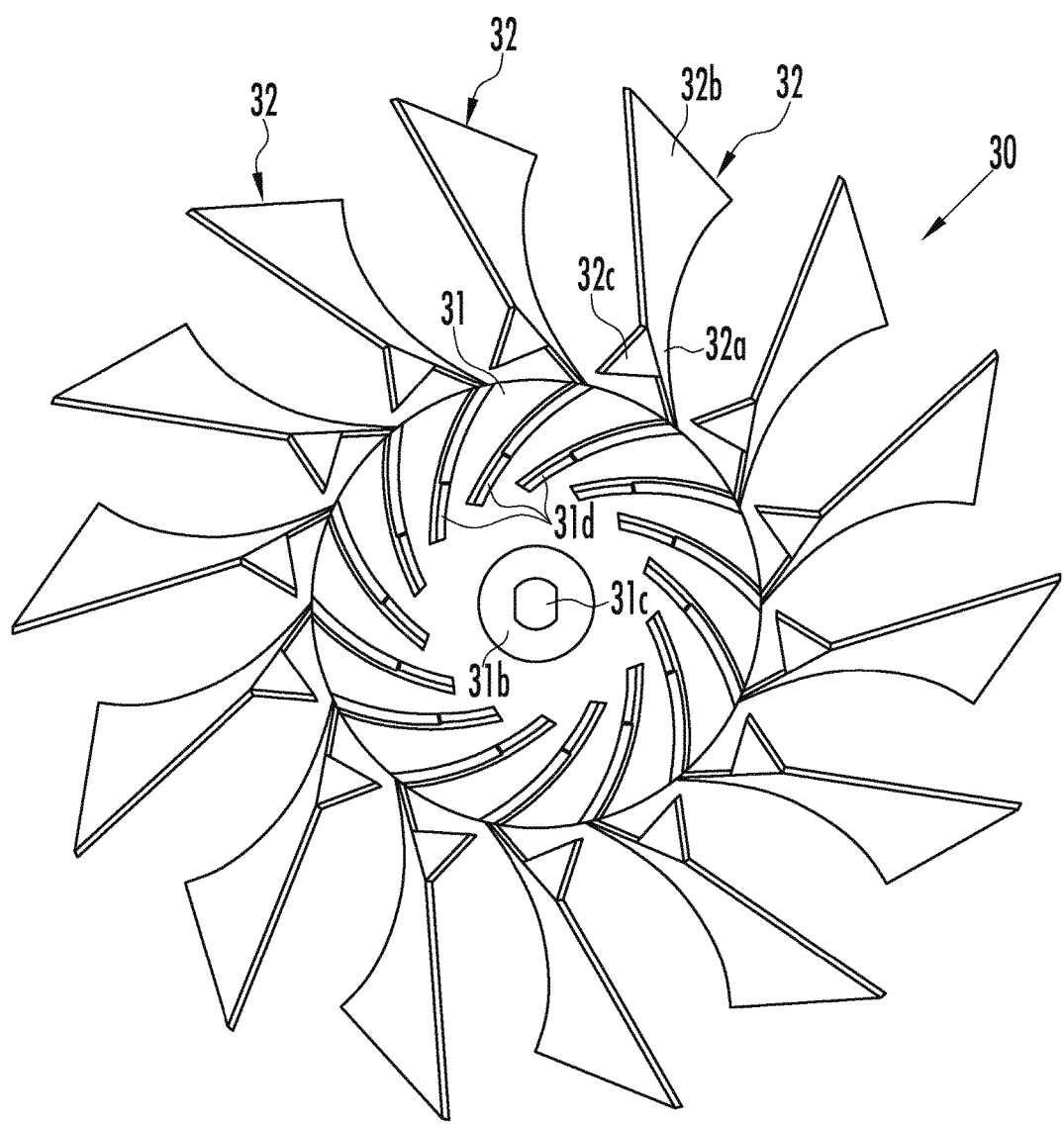

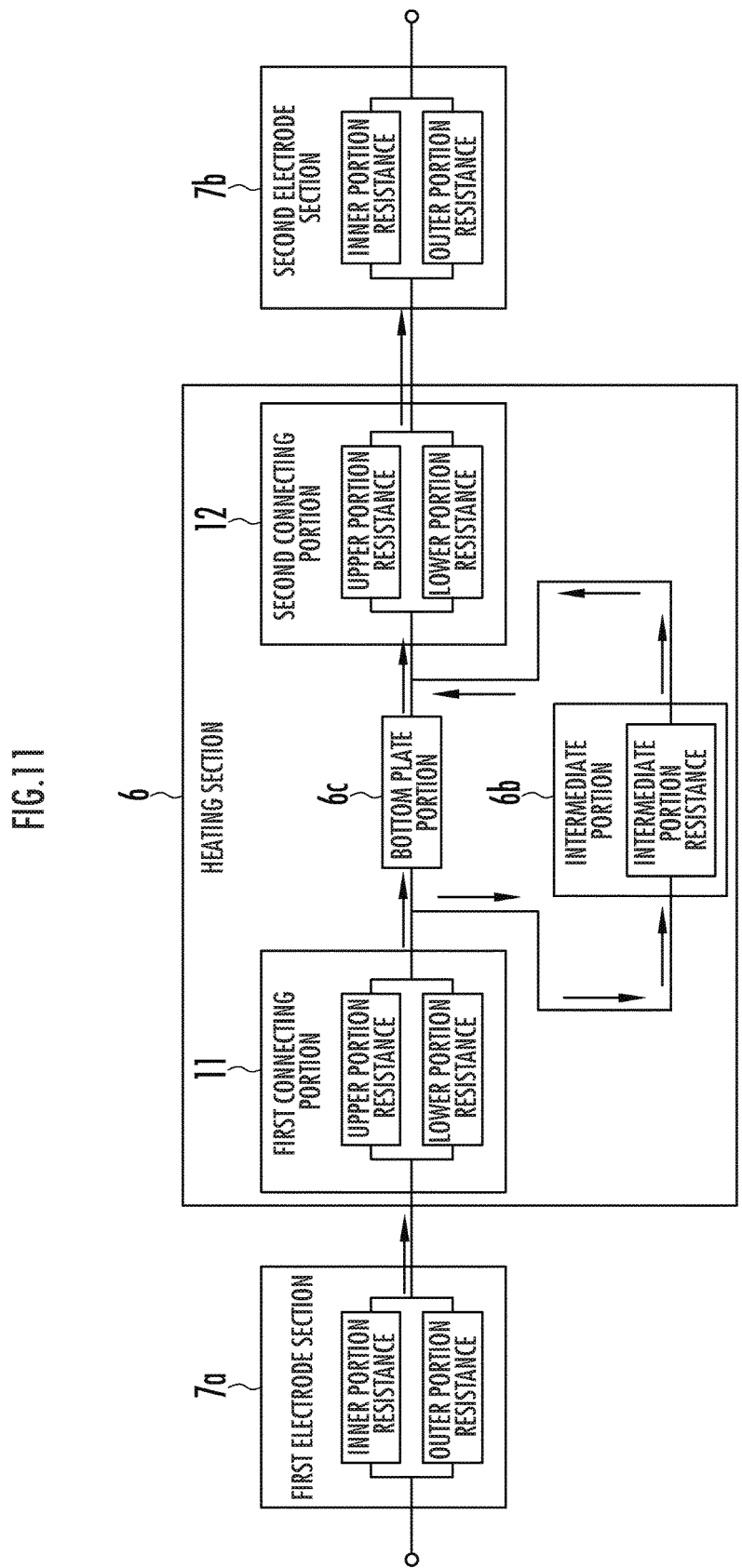

THERMAL CAULKING DEVICE

BACKGROUND OF THE INVENTION

Field of the Invention

The present invention relates to a thermal caulking device that joins multiple members to each other by heating.

Description of the Related Art

Thermal caulking devices are known to heat and melt multiple members so as to join a first member to a second member.

The thermal caulking device disclosed in International Publication No. 2017/47786 causes a boss of a to-be-caulked member to project from a hole formed at an inner circumferential surface of a conical member, and melts the boss by using a conical electrode tip so as to join the conical member and the to-be-caulked member to each other.

The thermal caulking device disclosed in International Publication No. 2017/47786 experiences unevenness in current when the current flows in the electrode tip, thereby causing non-uniform temperature in the electrode tip. When the temperature of the electrode tip becomes non-uniform, there is a possibility that the joining strength may be decreased since insufficient melting of the resin to be thermally caulked occurs at some places.

An object of the present invention, which has been made in view of such circumstances, is to provide a thermal caulking device that achieves reliable thermal caulking.

SUMMARY OF THE INVENTION

The thermal caulking device according to the present invention is a thermal caulking device which joins a first member to a second member by melting a boss of the second member being inserted into a through-hole formed in the first member and projecting inwardly from an inner circumferential surface of the first member, the first member having a cylindrical shape and a width gradually increasing from its bottom surface to its upper surface. The thermal caulking device includes a heat tip having a main body section whose outer circumferential surface is formed to extend along the inner circumferential surface of the first member and two plate-like terminal sections extending radially from the main body section and connected to an inner circumferential surface of the main body section; and a power supply unit arranged above the heat tip and configured to supply electricity to the main body section via the terminal sections, where at least either of the main body section and the terminal sections have a non-uniform thickness in a predetermined direction. It should be noted that at least either of the main body section and the terminal sections is preferably formed with non-uniform thickness in a predetermined direction such that the deviation of the amounts of heat generation in the individual portions of the main body section generating heat by the electricity supplied from the power supply unit, becomes small compared with a case where it is formed with a uniform thickness.

Amount of heat generation is obtained by $I^2 \times R$, where I is the current and R is the resistance, and the resistance is obtained by $R = \rho \times L/S$, where $\rho$, L, and S are the resistivity, the length, and the cross-sectional area, respectively. In other words, the amount of heat generation is proportional to the resistance R and the resistance R is inversely proportional to the cross-sectional area S, and the amount of heat generation is also inversely proportional to the cross-sectional area S. Accordingly, as the cross-sectional area becomes smaller, the amount of heat generation becomes larger.

In accordance with the present invention, at least either of the main body section and the terminal sections is formed with a non-uniform thickness in a predetermined direction. For example, at least either of the main body section and the terminal sections is formed with a non-uniform thickness in a predetermined direction such that the thickness of a portion where the current is small is smaller than the thickness of a portion where the current is large. As a result, deviation in the amounts of heat generation of the individual portions of the main body section generating heat by the electricity supplied from the power supply unit becomes smaller when compared with a case where it is formed with a uniform thickness. By virtue of this, it is made possible to suppress uneven melting by the heat tip and to achieve reliable thermal caulking when compared with a case where at least either of the main body section and the terminal sections is formed with a uniform thickness.

In addition, preferably, a thickness of a connecting portion interconnecting the main body section and each of the terminal sections on a narrow side which is a lower end portion of the main body section is larger than a thickness of a connecting portion interconnecting the main body section and each of the terminal sections on a wide side which is an upper end portion of the main body section.

The electricity flowing from the power supply unit to the terminal sections easily flows downward and does not easily flow laterally. As a result, in the connecting portion interconnecting the main body section and the terminal section, the current at the upper portion becomes smaller than the current at the lower portion.

According to the above-described features, the connecting portion interconnecting the main body section and the terminal section is formed such that its upper portion is thin with a small cross-sectional area and its lower portion is thick with a large cross-sectional area. These cross-sectional areas are defined such that the difference becomes small between the amount of heat generation ($I^2 \times R$) in the upper portion (whose cross-sectional area is small) where the current is small and the amount of heat generation in the lower portion (whose cross-sectional area is large) where the current is large when compared with a conventional device where the upper portion and the lower portion of the connecting portion have the same shape (cross-sectional area). By virtue of this, it is possible to decrease the difference in the amount of heat transferred from the connecting portion to the main body section when compared with a conventional device, to suppress uneven melting in the upper and lower portions of the main body section, and to achieve reliable thermal caulking.

It is further preferable that the thickness of the main body section of a connecting portion side connected to each of the terminal sections is larger than the thickness of the remaining portion thereof except for the connecting portion side connected to each of the terminal sections.

Since the electricity flowing in the main body section flows in the circumferential direction of the main body section, the main body section has a large current at the connecting portion to the terminal section and a small current at the portion farthest from the terminal section.

According to the above-described features, the main body section is formed such that the thickness of the connecting portion to the terminal section is larger than those of the remaining portions. These thicknesses are defined such that the difference becomes small between the amount of heat generation of the connecting portion (whose cross-sectional area is large) where the current is large and the amount of heat generation in the remaining portions away from the terminal section (whose cross-sectional area is small) where the current is small, when compared with a conventional device where the connecting portion of the main body section to the terminal section and the remaining portions of the main body section have the same thickness. By virtue of this, it is possible to suppress uneven melting in the circumferential direction of the main body section compared with a conventional device, thereby achieving reliable thermal caulking.

In addition, it is preferable that a thickness of an outer portion of each of the terminal sections where each terminal section is connected to a wide side of the main body section is smaller than a thickness of an inner portion of each of the terminal sections where each terminal section is connected to a narrow side of the main body section.

The electricity flowing from the power supply unit to the terminal section easily flows downward and does not easily flow laterally. As a result, in the terminal section, the electricity flowing in the outer portion becomes smaller than the electricity flowing in the lower portion in the inner portion.

According to the above-described features, the terminal section is formed such that its outer portion is thinner than its inner portion. These thicknesses are defined such that the difference becomes small between the amount of heat generation of the outer portion of the terminal section connected to the upper portion of the main body section (whose cross-sectional area is small) where the current is small and the amount of heat generation of the inner portion of the terminal section connected to the lower portion of the main body section (whose cross-sectional area is large) where the current is large, when compared with a conventional device where the outer portion and the inner portion of the terminal section have the same thickness (cross-sectional area). By virtue of this, it is possible to reduce the difference in the amount of heat transferred from the terminal section to the main body section compared with a conventional device, to suppress uneven melting in the upper portion and the lower portion of the main body section, thereby achieving reliable thermal caulking.

According to the present invention, it is possible to achieve reliable thermal caulking.

BRIEF DESCRIPTION OF THE DRAWINGS

FIG. 2 is a perspective view illustrating a heat tip that includes a heating section and an electrode section;

FIG. 3A is an upper cross-sectional view of the heat tip;

FIG. 4 is a bottom view illustrating an impeller prior to assembly;

FIG. 11 is an explanatory view illustrating an equivalent circuit of the present invention.

DETAILED DESCRIPTION OF THE PREFERRED EMBODIMENTS

Embodiments of the present invention will be described below with reference to the drawings.

Figure 1:
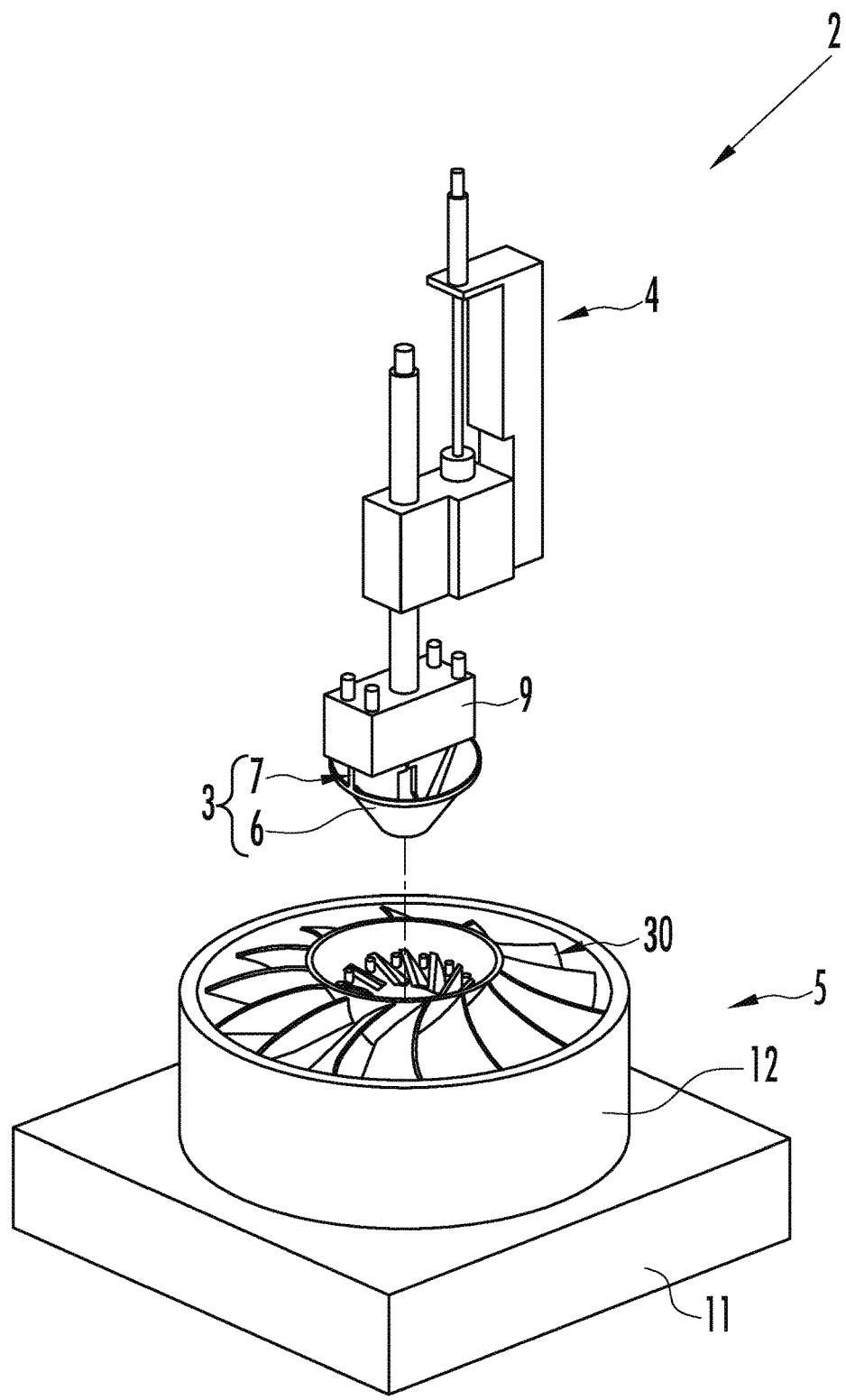
FIG. 1 is a schematic perspective view illustrating a thermal caulking device according to the present invention.

As illustrated in FIG. 1, a thermal caulking device 2 includes a heat tip 3, a heat tip driving unit 4, and a holding base 5. The thermal caulking device 2 is configured to thermally caulk an impeller 30, which is a member to be thermally caulked as will be described later in detail.

The heat tip 3 includes a heating section 6 (main body section) and an electrode section 7 (terminal section). The heating section 6 takes a shape of an inverted, substantially conical frustum and is formed such that it follows an inner circumferential surface of the impeller 30. The upper end portion and the lower end portion of the heating section 6 are opened. It should be noted that the shape of the heating section 6 is not limited to a truncated conical shape, but any shape may be encompassed as long as it is cylindrical with a sloping profile whose width gradually increases from its lower surface to its upper surface, e.g., a hemispherical shape.

The heat tip driving unit 4 includes a power supply unit 9 having a positive electrode and a negative electrode and supplying electricity to the electrode section 7.

The holding base 5 includes a base 11 and a cylindrical section 12 positioned on the base 11. The impeller 30 is housed in the cylindrical section 12. A positioning boss 11a is formed on an upper surface of the base 11. The positioning boss 11a projects upward inside of the cylindrical section 12 and is adapted to be inserted into an attachment hole 31c of the impeller 30 which will be described later.

As illustrated in FIG. 2, the electrode section 7 includes a first electrode section 7a and a second electrode section 7b which are connected to the heating section 6. The first electrode section 7a and the second electrode section 7b are formed such that their outer portions connected to the upper portion of the heating section 6 is thinner than their inner portions connected to the lower portion of the heating section 6. The first electrode section 7a and the second electrode section 7b are provided symmetrically in FIG. 2. It should be noted that the predetermined direction in accordance with the present invention is the radial direction of the heating section 6.

The positioning boss 11a of the holding base 5 is inserted into a notch in the inner portion of the first electrode section 7a and the second electrode section 7b when heating the impeller 30 set on the holding base 5.

As illustrated in FIGS. 1 and 2, the upper end portion of the first electrode section 7a is fixed to the positive electrode of the power supply unit 9 of the heat tip driving unit 4 and is electrically connected thereto. The upper end portion of the second electrode section 7b is fixed to the negative electrode of the power supply unit 9 and is electrically connected thereto. By virtue of this configuration, electricity is supplied from the positive electrode of the power supply unit 9 of the heat tip driving unit 4 to the heating section 6 via the first electrode section 7a. The electricity flowing through the heating section 6 further flows to the negative electrode of the power supply unit via the second electrode section 7b. A fixing screw (not shown) is inserted into a hole formed in the first electrode section 7a and the second electrode section 7b, and this fixing screw is fixed to the power supply unit 9.

Since the heating section 6 has electric resistance, electricity is supplied to the heating section 6 and thus the entire heating section 6 generates heat. In addition, the heat tip driving unit 4 is configured to be capable of moving the power supply unit 9 in the vertical direction. The heat tip 3 is movable in the vertical direction in FIG. 1 by the heat tip driving unit 4 driving the power supply unit 9 in the vertical direction.

The root portion of the first electrode section 7a is provided continuously along the sloping surface of the inner circumferential surface of the heating section 6, and the tip end portion thereof projects from the upper surface of the heating section 6. The inner circumferential sloping surface of the heating section 6 and the first electrode section 7a are connected by an R-shaped first connecting portion 21. The first connecting portion 21 is formed across the inner circumferential sloping surface of the heating section 6 and the first electrode section 7a and constitutes a part of the heating section 6. The first connecting portion 21 is formed at both ends in the thickness direction of the first electrode section 7a.

The root portion of the second electrode section 7b is provided continuously along the sloping surface of the inner circumferential surface of the heating section 6, and the tip end portion thereof projects from the upper surface of the heating section 6. The inner circumferential sloping surface of the heating section 6 and the second electrode section 7b are connected by an R-shaped second connecting portion 22. The second connecting portion 22 is formed across the inner circumferential sloping surface of the heating section 6 and the second electrode section 7b and constitutes a part of the heating section 6. The second connecting portion 22 is formed at both ends in the thickness direction of the second electrode section 7b.

Figure 3B:
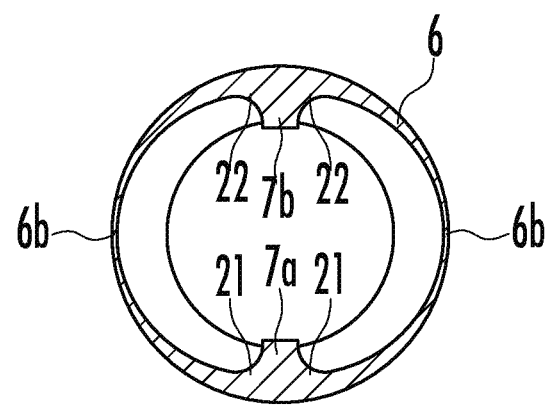
FIG. 3B is a lower cross-sectional view of the heat tip.

The second connecting portion 22 is formed such that R (predetermined direction) gradually increases from the upper end to the lower end. As a result, the upper portion of the second connecting portion 22 is thin (see FIG. 3A) and the lower portion thereof is thick (see FIG. 3B).

Likewise, the first connecting portion 21 is formed such that the R (predetermined direction) gradually increases from the upper end to the lower end. As a result, the upper portion of the first connecting portion 21 is thin (see FIG. 3A) and the lower portion thereof is thick (see FIG. 3B). It should be noted that the first connecting portion 21 and the second connecting portion 22 are not limited to the R shape but may be formed in a straight tapered shape as long as the upper portion is thin and the lower portion is thick.

A convex stepped portion 6a is formed on the upper end portion of the outer circumferential surface of the heating section 6. The stepped portion 6a projects outward in the radial direction of the heating section 6 from the upper end portion of the outer circumferential surface of the heating section 6 and continuously extends so as to make one round in the circumferential direction of the upper end portion of the outer circumferential surface of the heating section 6. As will be described in detail later, the stepped portion 6a prevents a melted portion 32c1 constituted by the boss 32c melted by thermal caulking from flowing out beyond the upper end portion of the heat tip 3.

The heating section 6 is formed such that the thicknesses of the first connecting portion 21 and the second connecting portion 22 connected to the first electrode section 7a and the second electrode section 7b are the largest while the thickness of the intermediate portion 6b farthest from the first connecting portion 21 and the second connecting portion 22 are the smallest. In addition, a bottom plate portion 6c is formed in the heating section 6. It should be noted that the predetermined direction in accordance with the present invention is the circumferential direction of the heating section 6.

As illustrated in FIG. 4, the impeller 30 is used for blowing air in a fan or the like. The impeller 30 includes a resin main body section 31 (first member) and a blade portion 32 (second member) which are each made of polypropylene (PP).

Figure 5:
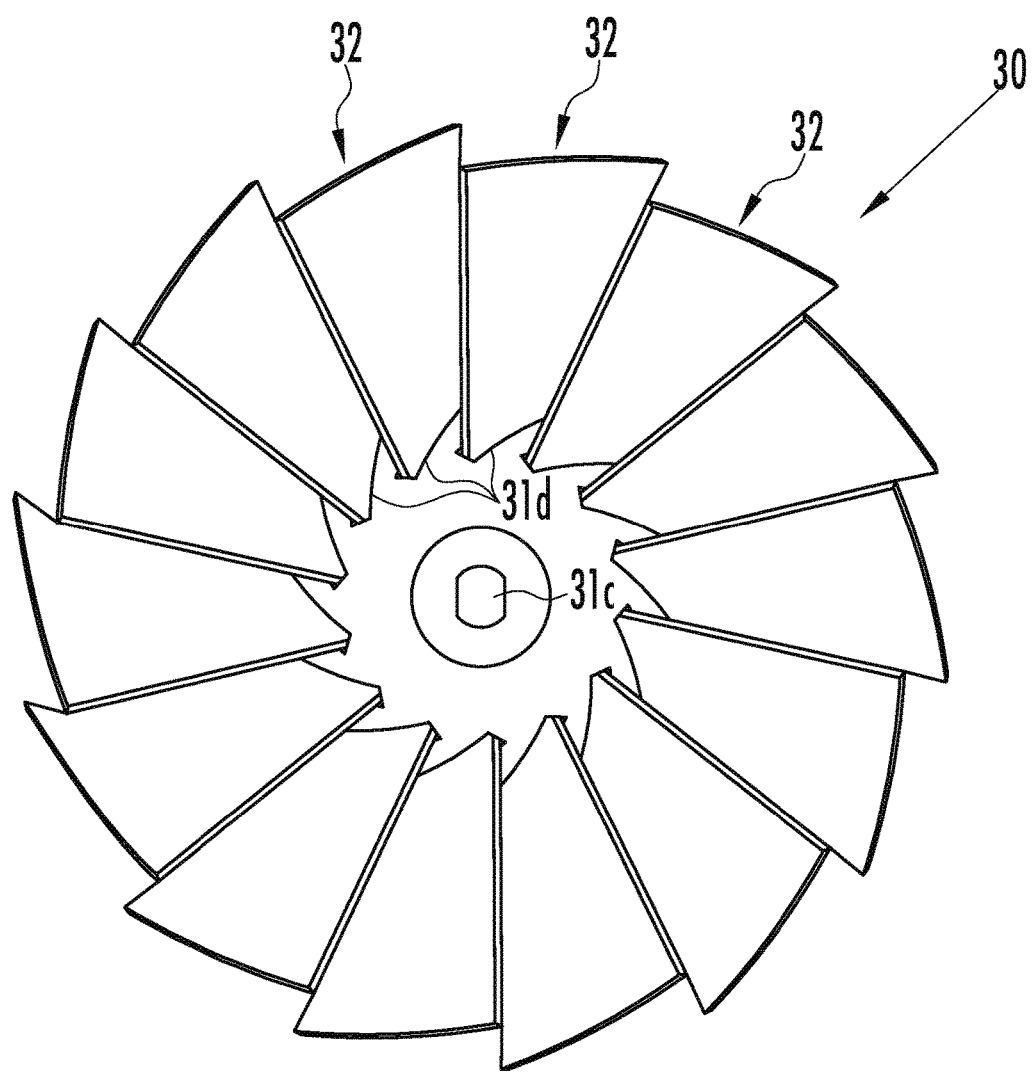
FIG. 5 is a bottom view illustrating the impeller after assembly.
Figure 6:
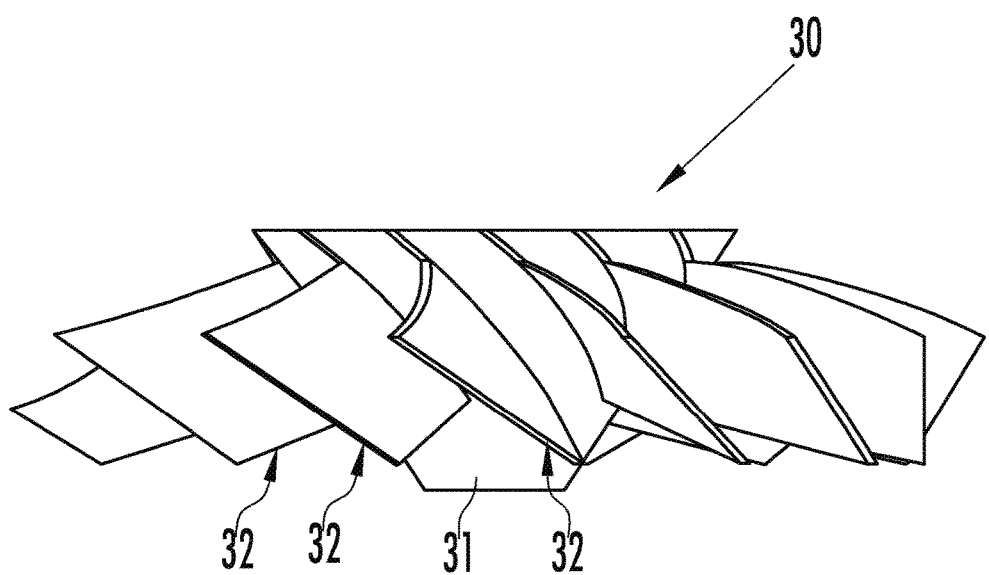
FIG. 6 is a side view illustrating the impeller after assembly.

As illustrated in FIGS. 4 to 8, the main body section 31 is formed in a frustum cylindrical shape in which a hollow portion 31a is formed. The lower end portion of the main body section 31 in FIG. 6 is closed by a lower plate portion 31b. the attachment hole 31c is formed in the lower plate portion 31b such that a drive shaft of a drive source for driving the impeller 30 is inserted in the attachment hole 31c and attached thereto. The attachment hole 31c is defined by a shape formed by two arcs that are D-cut at its two facing portions. It should be noted that the shape of the main body section 31 is not limited to a frustum shape but any shape may be encompassed as long as it is cylindrical with a sloping profile whose width gradually increases from its lower surface to its upper surface, e.g., a hemispherical shape.

A plurality of joining holes 31d are formed on the side surface of the main body section 31. The joining hole 31d obliquely extends in the circumferential direction of the side surface of the main body section 31 from the vicinity of the center in the radial direction of the side surface of the main body section 31 toward the outer circumferential side of the side surface of the main body section 31. The joining hole 31d extends to the vicinity of the outer peripheral portion of the side surface of the main body section 31.

The inner peripheral portion of the joining hole 31d is constituted by a through-hole. The outer peripheral portion of the joining hole 31d is constituted by a groove recessed from the side surface of the main body section 31. A plurality (14 in the present embodiment) of the joining holes 31d are formed at equal intervals in the circumferential direction of the side surface of the main body section 31.

Figure 7:
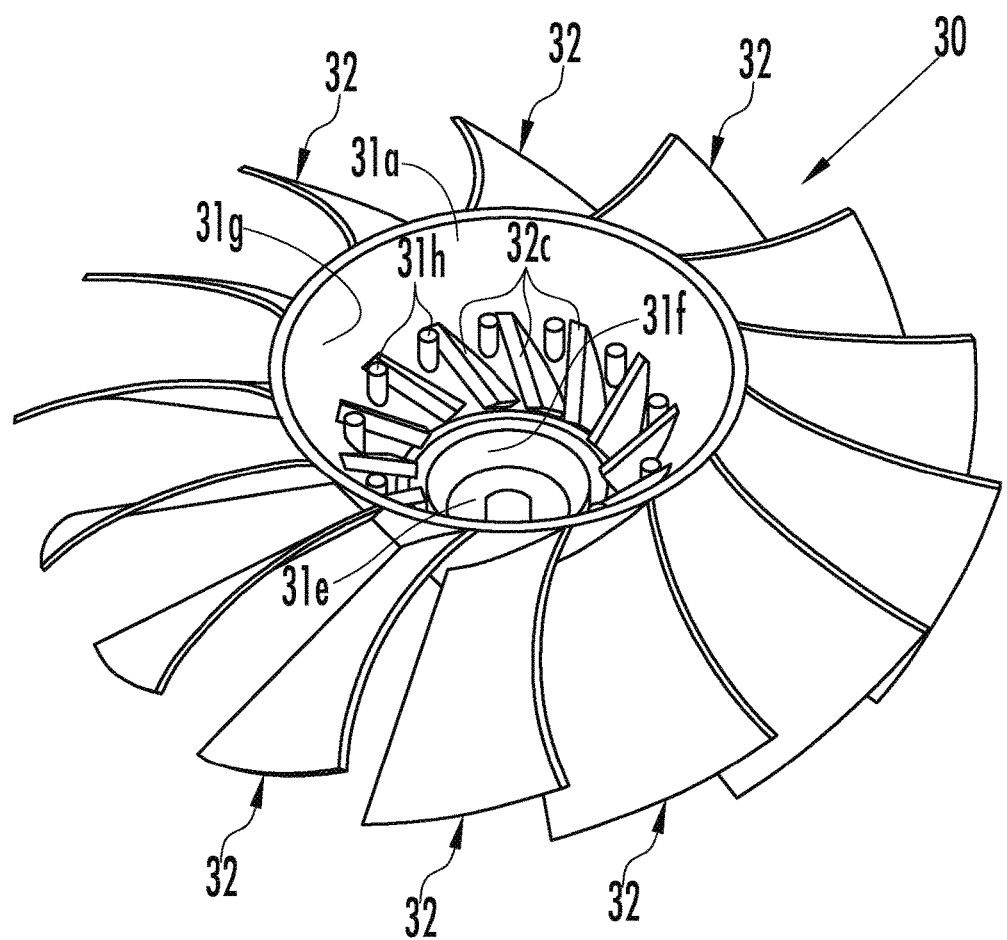
FIG. 7 is a perspective view illustrating the impeller after assembly.
Figure 8:
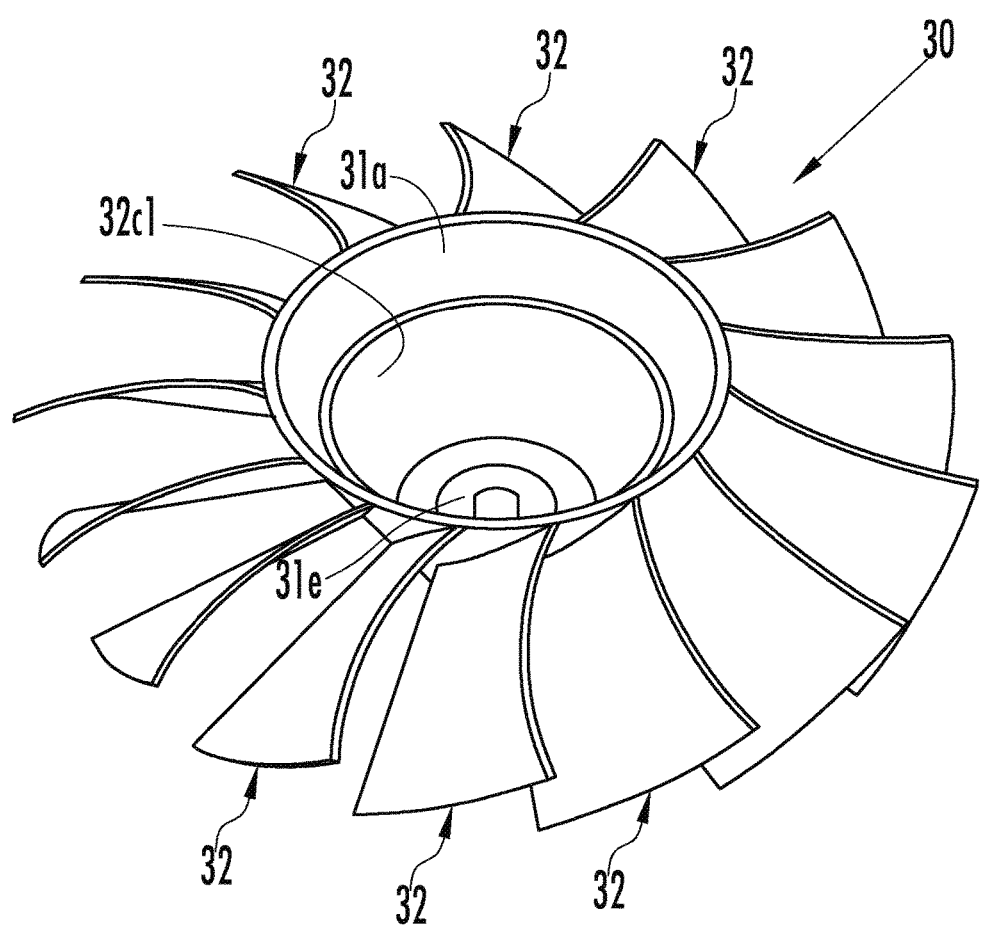
FIG. 8 is a perspective view illustrating the impeller after caulking by the thermal caulking device.
Figure 9:
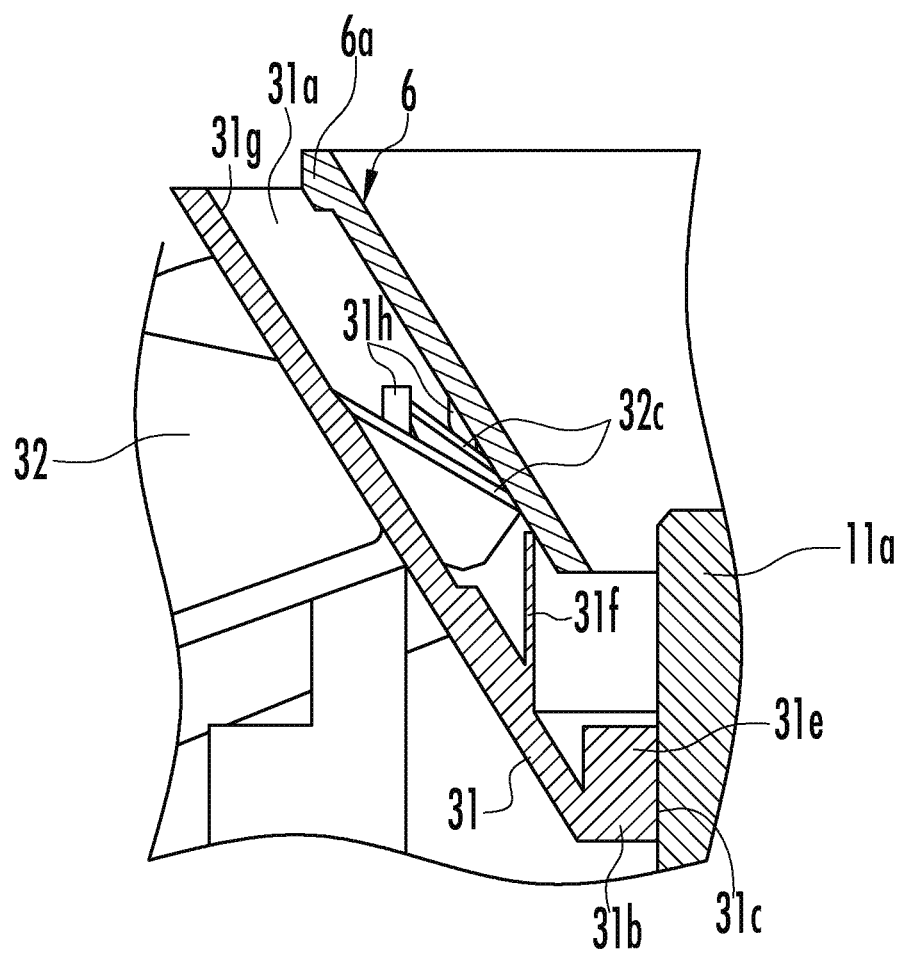
FIG. 9 is a cross-sectional view illustrating a state where the heat tip begins to melt a boss of the impeller.

As illustrated in FIGS. 7 to 9, a columnar central convex portion 31e extending upward is formed on the inner surface of the lower plate portion 31b of the main body section 31. The central convex portion 31e is formed so as to be coaxial with the disk-shaped lower plate portion 31b. The attachment hole 31c penetrates the central convex portion 31e and the lower plate portion 31b.

When the impeller 30 is accommodated in the cylindrical section 12 of the holding base 5, the positioning boss 11a of the holding base 5 is inserted into the attachment hole 31c. The impeller 30 is positioned by virtue of this insertion.

A partition wall 31f is formed at the position which is the inner circumferential surface of the main body section 31 in a state before the thermal caulking is performed and corresponds to the lower end portion of the melted portion 32c1 (see FIG. 10) formed by melting the boss 32c by thermal caulking as will be described later. The partition wall 31f has a cylindrical shape and is formed so as to be coaxial with the central convex portion 31e. The partition wall 31f is larger in diameter than the central convex portion 31e and formed so as to surround the central convex portion 31e.

The partition wall 31f has a height ensuring that the partition wall 31f does not brought into contact with the heat tip 3 when the heat tip 3 is brought into contact with the boss 32c by heat caulking and that the melted portion 32c1 does not spill out from the space between the partition wall 31f and the inner circumferential surface of the main body section 31. The partition wall 31f stops the flow of the melted portion 32c1 constituted by the boss 32c melted by thermal caulking downward in FIG. 9 beyond the partition wall 31f.

As illustrated in FIGS. 7 and 9, an inner circumference diameter-enlarged portion 31g is formed on the inner circumferential surface of the main body section 31. The inner circumference diameter-enlarged portion 318g is a portion where the side surface of the main body section 31 is thinly formed. The inner circumference diameter-enlarged portion 31g is formed from the vicinity of the portion to which the partition wall 31f of the main body section 31 is connected to the upper end portion of the main body section 31 in FIG. 9.

A predetermined gap is ensured between the inner circumferential surface of the inner circumference diameter-enlarged portion 31g and the outer circumferential surface of the heat tip 3 as will be described later, during the thermal caulking. A predetermined amount of the melted portion 32c1 constituted by the melted boss 32c can be held in this predetermined gap.

In addition, an adjustment convex portions 31h are formed in the inner circumferential surface of the main body section 31 in a state before the thermal caulking is performed and in the vicinity of the joining hole 31d. The adjustment convex portions 31h are formed on a one-to-one basis in the joining holes 31d and are provided for supplying resin in an amount necessary for joining the blade portions 32 to the main body section 31. The adjustment convex portion 31h is melted by thermal caulking and is integrated with the melted boss 32c so as to constitute the melted portion 32c1.

As illustrated in FIG. 4, the blade portion 32 includes a bone portion 32a on the base side, a blade body portion 32b on the end side, and a boss 32c, and is formed in a shape of a plate. 14 blade portions 32 are formed corresponding to the joining holes 31d. The bone portion 32a is formed in a shape substantially matching the joining hole 31d and is fitted in the joining hole 31d.

The root portion of the bone portion 32a is formed integrally with the main body section 31. As illustrated in FIG. 4, the blade portion 32 is rotated (bent) about the root portion of the bone portion 32a from the state where the bone portion 32a is not fitted in the joining hole 31d. As a result, as illustrated in FIG. 5, the bone portion 32a is fitted in the joining hole 31d.

The blade body portion 32b is formed in a curved shape provided continuously to the bone portion 32a. As illustrated in FIG. 5, the 14 blade body portions 32b are formed such that any two of them adjacent to each other overlap with each other when viewed in the axial direction of the main body section 31.

The boss 32c is formed in a substantially triangular shape and provided continuously to the bone portion 32a. When the bone portion 32a is fitted in the joining hole 31d, the boss 32c is fitted in the joining hole 31d and projects from the inner circumferential surface of the main body section 31 to the hollow portion 31a (see FIG. 9).

[Thermal Caulking]

Figure 10:
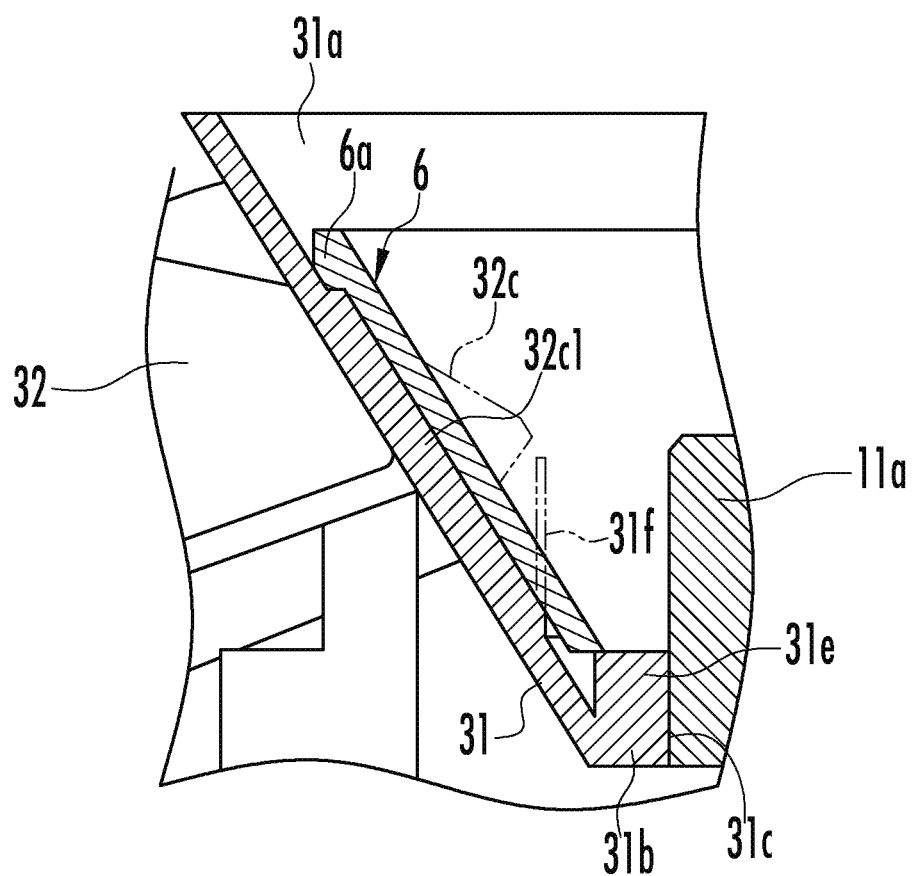
FIG. 10 is a cross-sectional view illustrating a state where the heat tip has melted the boss of the impeller and the partition wall.

FIG. 9 is a cross-sectional view showing a state where the heat tip 3 begins to melt the boss 32c in the thermal caulking in accordance with the embodiment of the present invention. FIG. 10 is a cross-sectional view showing a state where the heat tip 3 melts the boss 32c and the partition wall 31f in the thermal caulking in accordance with the embodiment of the present invention.

In the thermal caulking, the impeller 30 is first housed in the cylindrical section 12 of the holding base 5, and the positioning boss 11a of the holding base 5 is then inserted into the attachment hole 31c of the impeller 30. As a result, as illustrated in FIG. 1, the impeller 30 is placed in a state where it is held on the holding base 5.

Next, the heat tip driving unit 4 lowers the heat tip 3 and inserts the heat tip 3 into the hollow portion 31a of the main body section 31.

Then, as illustrated in FIG. 9, by bringing the heating section 6 of the heat tip 3 into contact with the 14 bosses 32c, the adjustment convex portion 31h is melted and the 14 bosses 32c are melted so as to form the melted portion 32c1.

The melted portion 32c1 flows downward. However, the heating section 6 of the heat tip 3 is not in abutment on the partition wall 31f, and the partition wall 31f is not melted. Accordingly, the melted portion 32c1 flowing downward is prevented by the presence of the partition wall 31f from flowing downward beyond the partition wall 31f and remains between the partition wall 31f and the inner circumferential surface of the main body section 31. As a result, the resin amount of the melted portion 32c1 is maintained at a predetermined amount.

Then, the heat tip driving unit 4 further lowers the heat tip 3 to abut against the partition wall 31f and stops moving down the heat tip 3. As a result, the partition wall 31f is melted. The partition wall 31f is melted while being deformed in the outer circumferential direction of the main body section 31. The melted partition wall 31f is integrated with the melted portion 32c1, and the resin amount of the melted portion 32c1 further increases.

After the partition wall 31f is sufficiently melted, the heat tip driving unit 4 lowers the heat tip 3 to press the melted portion 32c1. Then, when the lower end of the heating section 6 is positioned at the same height as the inner surface of the central convex portion 31e, the heat tip driving unit 4 stops moving down the heat tip 3.

By the above operation, the partition wall 31f is integrated with the melted portion 32c1, and the melted portion 32c1 is arranged mainly in the inner circumference diameter-enlarged portion 31g. Then, the melted portion 32c1 is solidified by lowering the temperature of the heat tip 3. The bosses 32c of the 14 blade portions 32 constituting the melted portion 32c are melted and integrated and then solidified and connected to each other and are thus joined to the main body section 31. The impeller 30 that has been thermally caulked as described above typically constitutes a diagonal flow fan.

[Flow of Electricity]

As illustrated in FIG. 11, the electricity supplied from the power supply unit 9 of the heat tip driving unit 4 flows from the positive electrode of the power supply unit 9 to the upper portion of the first electrode section 7a. The electricity flowing to the upper portion of the first electrode section 7a flows to the lower portion and side portions of the first electrode section 7a. Electricity that has flowed to the lower portion and the side portions of the first electrode section 7a flows through the first connecting portion 21 to the heating section 6.

The electricity flowing to the heating section 6 flows from the upper portion of the heating section 6 to the lower portion thereof. Further, the electricity flowing to the heating section 6 flows in the circumferential direction of the heating section 6. Electricity flowing in the circumferential direction of the heating section 6 flows through the intermediate portion 6b to the second connecting portion 22.

Electricity flowing downward through the heating section 6 and the first connecting portion 21 flows through the bottom plate portion 6c to the second connecting portion 22. The electricity flowing to the second connecting portion 22 flows to the second electrode section 7b.

The electricity flowing to the second electrode section 7b flows from the lower portion of the second electrode section 7b toward the upper portion thereof. The electricity flowing to the upper portion of the second electrode section 7b flows to the negative electrode of the power supply unit 9. This is the flow of electricity in the thermal caulking device 2.

Electricity flowing from the positive electrode of the power supply unit 9 to the upper portion of the first electrode section 7a flows easily downward (which may include obliquely downward) and does not easily flow laterally. Therefore, in the first connecting portion 21 connecting the heating section 6 and the first electrode section 7a, the current in the upper portion becomes smaller than the current in the lower portion. If the current is I and the resistance is R, then the amount of heat generation is obtained by $I^2 \times R$, so that the amount of heat generation at the upper portion becomes smaller than the amount of heat generation at the lower portion.

The resistance R is obtained by $R = \rho \times L/S$ where resistivity is $\rho$, the length is L, and the cross-sectional area is S. That is, the amount of heat generation is proportional to the resistance R, the resistance R is inversely proportional to the cross-sectional area S, and the amount of heat generation is also inversely proportional to the cross-sectional area S. Therefore, as the cross-sectional area becomes smaller, the amount of heat generation becomes larger.

In the present embodiment, the first connecting portion 21 is thin at its upper portion (see FIG. 3A) with a small cross-sectional area and thick at its lower portion (see FIG. 3B) with a larger cross-sectional area. Compared with a conventional device in which the upper portion and the lower portion of the first connecting portion 21 have the same shape (cross-sectional area), these cross-sectional areas are defined such that the difference becomes small between the amount of heat generation ($I^2 \times R$) at the upper portion where small current flows and the amount of heat generation at the lower portion where large current flows. By virtue of this, it is made possible to reduce the difference in the amounts of heat transferred from the upper and lower portions of the first connecting portion 21 to the heating section 6 compared with a conventional device, suppress uneven melting between the upper portion and the lower portion of the heating section 6, and thereby achieve reliable thermal caulking.

In addition, the electricity passing through the bottom plate portion 6c and the electricity flowing in the circumferential direction of the heating section 6 flow in the lower portion of the second connecting portion 22. On the other hand, only the electricity flowing in the circumferential direction of the heating section 6 flows in the upper portion of the second connecting portion 22. Accordingly, the current in the lower portion of the second connecting portion 22 is larger than the current in the upper portion of the second electrode section 7b.

In the present embodiment, the second connecting portion 22 is thin at its upper portion (see FIG. 3A) with a small cross-sectional area and thick at its lower portion (see FIG. 3B) with a large cross-sectional area. Compared with a conventional device in which the upper portion and the lower portion of the second connecting portion 22 have the same cross-sectional area, these cross-sectional areas are defined such that the difference becomes small between the amount of heat generation ($I^2 \times R$) at the upper portion where small current flows and the amount of heat generation at the lower portion where large current flows. By virtue of this, it is made possible to reduce the difference in the amounts of heat transferred from the upper and lower portions of the second connecting portion 22 to the heating section 6 compared with a conventional device, and to suppress uneven melting between the upper portion and the lower portion of the heating section 6, and thereby achieving reliable thermal caulking.

Electricity flowing from the positive electrode of the power supply unit 9 to the upper portion of the first electrode section 7a flows easily downward and does not easily flow laterally. Therefore, the current in the inner portion of the first electrode section 7a is larger than the current in the outer portion of the first electrode section 7a.

In the present embodiment, the first electrode section 7a is formed such that the thickness of the outer portion is smaller than the thickness of the inner portion. Compared with a conventional device in which the outer portion and the inner portion of the first electrode section 7a have the same thickness, these thicknesses are defined such that the difference becomes small between the amount of heat generation ($I^2 \times R$) at the upper portion as the outer portion where small current flows and the amount of heat generation at the lower portion as the inner portion where large current flows. By virtue of this, it is made possible to reduce the difference in the amounts of heat transferred from the first electrode section 7a to the heating section 6 compared with a conventional device, and to suppress uneven melting between the upper portion and the lower portion of the heating section 6, and thereby achieving reliable thermal caulking.

In addition, the electricity passing through the bottom plate portion 6c and the second connecting portion 22 and the electricity flowing in the circumferential direction of the heating section 6 and passing through the second connecting portion 22 flow in the inner portion of the lower portion of the second electrode section 7b. On the other hand, only the electricity flowing in the circumferential direction of the heating section 6 and passing through the second connecting portion 22 flows in the outer portion of the upper portion of the second electrode section 7b. Accordingly, the current in the inner portion of the second electrode section 7b is larger than the current in the outer portion of the second electrode section 7b.

In the present embodiment, the second electrode section 7b is formed such that the thickness of its outer portion is smaller than the thickness of the inner portion. Compared with a conventional device in which the outer portion and the inner portion of the second electrode section 7b have the same thickness, these thicknesses are defined such that the difference becomes small between the amount of heat generation ($I^2 \times R$) at the upper portion as the outer portion where small current flows and the amount of heat generation at the lower portion as the inner portion where large current flows. By virtue of this, it is made possible to reduce the difference in the amounts of heat transferred from the second electrode section 7b to the heating section 6 compared with a conventional device, and to suppress uneven melting between the upper portion and the lower portion of the heating section 6, and thereby achieving reliable thermal caulking.

Further, in the heating section 6, electricity flows in the circumferential direction from the first connecting portion 21, flows through the intermediate portion 6b, and flows to the second connecting portion 22. Therefore, the current in the intermediate portion 6*b* is smaller than the current in the first connecting portion 21. In addition, electricity flowing in the circumferential direction of the heating section 6 and passing through the intermediate portion 6*b* and electricity passing through the bottom plate portion 6*c* flow in the second connecting portion 22. Therefore, the current in the intermediate portion 6*b* is smaller than the current in the second connecting portion 22.

In the present embodiment, the heating section 6 is formed such that the thickness of the intermediate portion 6*b* is smaller than the thicknesses of the first connecting portion 21 and the second connecting portion 22. Compared with a conventional device in which the first connecting portion 21, the second connecting portion 22 and the intermediate portion 6*b* have the same thickness, these thicknesses are defined such that the difference becomes small between the amount of heat generation ($I^2 \times R$) at the first connecting portion 21 and the second connecting portion 22 where large current flows and the amount of heat generation at the intermediate portion 6*b* where small current flows. By virtue of this, it is made possible to suppress uneven melting between the first connecting portion 21, the second connecting portion 22 and the intermediate portion 6*b*, and thereby achieve reliable thermal caulking.

In the above embodiment, the first connecting portion 21 and the second connecting portion 22 are formed such that the thickness thereof increases from the upper end to the lower end (first forming condition). Further, the heating section 6 is formed such that the thickness of the intermediate portion 6*b* is smaller than the thicknesses of the first connecting portion 21 and the second connecting portion 22 (second forming condition). Further, the first electrode section 7*a* and the second electrode section 7*b* are formed such that the outer portion is thinner than the inner portion (third forming condition). The present invention is not limited to this, and it suffices that at least one of the first to third forming conditions is implemented.

In the above embodiment, the difference in the cross-sectional areas between the upper portions and the lower portions of the first connecting portion 21 and the second connecting portion 22 is discussed. Meanwhile, the embodiments are not limited to the difference in the cross-sectional areas between the upper portion and the lower portion. The first connecting portion 21 and the second connecting portion 22 as a whole are formed with a non-uniform thickness so that the deviation of the amounts of heat generation at the individual portions of the heating section 6 becomes small compared with a conventional device where the first connecting portion 21 and the second connecting portion 22 are uniform in thickness. As a result, it is possible to suppress uneven melting in the individual portions of the heating section 6 compared with a conventional device, and thereby achieving reliable thermal caulking.

In the above embodiment, the difference in the cross-sectional areas between the cross-sectional areas of the first connecting portion 21 and the second connecting portion 22 of the heating section 6 and the cross-sectional area of the intermediate portion 6*b* is discussed. Meanwhile, the embodiments are not limited to the difference in the cross-sectional areas between the first connecting portion 21 and the second connecting portion 22 of the heating section 6 and the cross-sectional area of the intermediate portion 6*b*. The heating section 6 as a whole has a non-uniform thickness in the circumferential direction such that, the deviation in the amounts of heat generation at the individual portions of the heating section 6 becomes small compared with a conventional device where the heating section 6 is uniform in thickness. By virtue of this, it is made possible to suppress uneven melting in the individual portions of the heating section 6 compared with a conventional device, and thereby achieving reliable thermal caulking.

What is claimed is:

1. The A thermal caulking device which joins a first member to a second member by melting a boss of the second member being inserted into a through-hole formed in the first member and projecting inwardly from an inner circumferential surface of the first member, the first member having a cylindrical shape and a width gradually increasing from a bottom surface of the first member to an upper surface of the first member, the thermal caulking device comprising:
   a heat tip having
      a main body section whose outer circumferential surface is formed to extend along the inner circumferential surface of the first member and
      two plate-like terminal sections extending radially from the main body section and connected to an inner circumferential surface of the main body section; and
   a power supply unit arranged above the heat tip and configured to supply electricity to the main body section via the terminal sections,
   wherein:
   at least either of the main body section and the terminal sections has a non-uniform thickness in a predetermined direction, and
   a thickness of a connecting portion interconnecting the main body section and each of the terminal sections on a narrow side which is a lower end portion of the main body section is larger than a thickness of a connecting portion interconnecting the main body section and each of the terminal sections on a wide side which is an upper end portion of the main body section.

2. A thermal caulking device which joins a first member to a second member by melting a boss of the second member being inserted into a through-hole formed in the first member and projecting inwardly from an inner circumferential surface of the first member, the first member having a cylindrical shape and a width gradually increasing from a bottom surface of the first member to an upper surface of the first member, the thermal caulking device comprising:
   a heat tip having
      a main body section whose outer circumferential surface is formed to extend along the inner circumferential surface of the first member and
      two plate-like terminal sections extending radially from the main body section and connected to an inner circumferential surface of the main body section; and
   a power supply unit arranged above the heat tip and configured to supply electricity to the main body section via the terminal sections,
   wherein:
   at least either of the main body section and the terminal sections has a non-uniform thickness in a predetermined direction, and
   a thickness of the main body section of a connecting portion side connected to each of the terminal sections is larger than a thickness of a remaining portion thereof except for the connecting portion side connected to each of the terminal sections.

3. A thermal caulking device which joins a first member to a second member by melting a boss of the second member being inserted into a through-hole formed in the first member and projecting inwardly from an inner circumferential surface of the first member, the first member having a cylindrical shape and a width gradually increasing from a bottom surface of the first member to an upper surface of the first member, the thermal caulking device comprising:
- a heat tip having
  - a main body section whose outer circumferential surface is formed to extend along the inner circumferential surface of the first member and
  - two plate-like terminal sections extending radially from the main body section and connected to an inner circumferential surface of the main body section; and
- a power supply unit arranged above the heat tip and configured to supply electricity to the main body section via the terminal sections, wherein:
- at least either of the main body section and the terminal sections has a non-uniform thickness in a predetermined direction, and
- a thickness of an outer portion of each of the terminal sections where each terminal section is connected to a wide side of the main body section, is smaller than a thickness of an inner portion of each of the terminal sections where each terminal section is connected to a narrow side of the main body section.

\* \* \* \* \*